United States Patent [19]
Vesilind et al.

[11] Patent Number: 5,710,362
[45] Date of Patent: Jan. 20, 1998

[54] LANDFILL LINER FOR CAPTURING CERTAIN LEACHATE CONTAMINANTS IN THE EVENT OF LEAKAGE

[75] Inventors: P. Aarne Vesilind, Chapel Hill; Tsau-don Tsai, Durham, both of N.C.

[73] Assignee: Duke University, Durham, N.C.

[21] Appl. No.: 650,443

[22] Filed: May 20, 1996

[51] Int. Cl.⁶ ............................................. B09B 1/00
[52] U.S. Cl. ..................... 588/259; 210/901; 405/129
[58] Field of Search ................... 405/128, 129; 210/901; 588/249, 250, 259

[56] References Cited

U.S. PATENT DOCUMENTS

| | | | |
|---|---|---|---|
| 4,255,067 | 3/1981 | Wright | 588/259 |
| 4,430,021 | 2/1984 | Wagner et al. | 588/259 |
| 4,439,062 | 3/1984 | Kingsbury | 588/260 X |
| 4,624,604 | 11/1986 | Wagner et al. | 405/128 |
| 4,650,086 | 3/1987 | Morrison, Jr. | 588/900 X |
| 4,810,131 | 3/1989 | Turner | 405/129 |
| 5,190,406 | 3/1993 | Shannonhouse et al. | 405/129 |
| 5,201,609 | 4/1993 | Johnson | 405/129 |

*Primary Examiner*—George A. Suchfield
*Attorney, Agent, or Firm*—Richard E. Jenkins, P.A.

[57] ABSTRACT

A landfill liner comprising clay and lime for capturing certain leachate contaminants, particularly potentially toxic heavy metals. The lime acts to absorb significantly more of the potentially toxic heavy metals than would a conventional clay landfill liner.

10 Claims, 1 Drawing Sheet

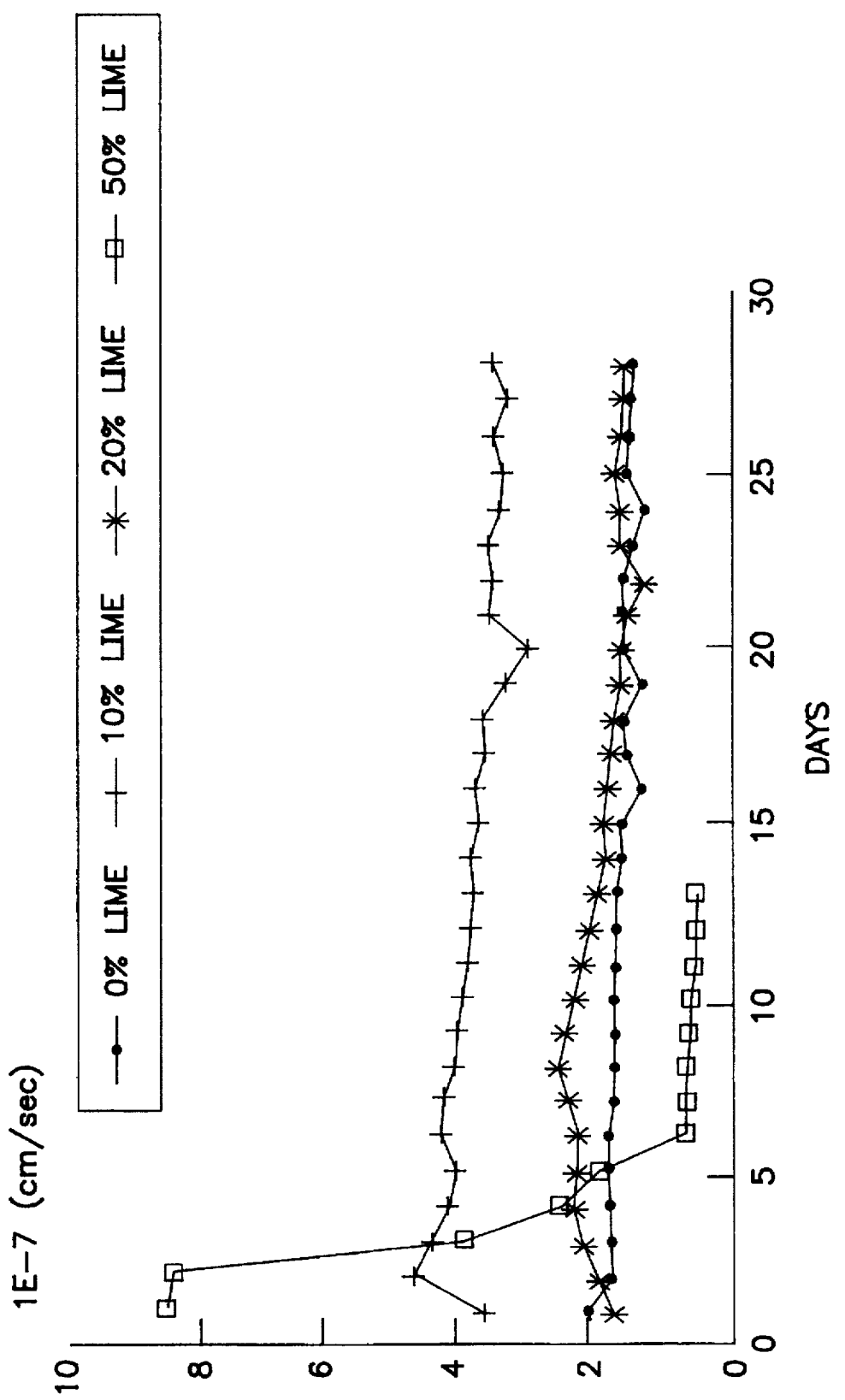

LANDFILL LINER FOR CAPTURING CERTAIN LEACHATE CONTAMINANTS IN THE EVENT OF LEAKAGE

TECHNICAL FIELD

The present invention relates to landfill liners, and more particularly to an improved landfill liner for capturing heavy metals and the like to prevent groundwater contamination in the event of leachate leakage through the landfill liner.

RELATED ART

Modern landfill liners in the United States as well as in many other countries in the world are formed of either a synthetic plastic membrane or bentonite clay or a combination of both types of liners. In each case, the objective is to prevent leachate that is produced in municipal solid waste and hazardous waste landfills from seeping through the ground and into the groundwater. This is necessary since once the groundwater is contaminated, it is extremely difficult to clean and render the water safe again for human use.

As is well known to those skilled in the art, the constituents of leachate that give it a significant pollution potential are (1) organic chemicals such as pesticides and solvents and (2) inorganic materials such as heavy metals. The heavy metals are of particular concern as a contaminant to groundwater since at high concentrations the heavy metals are potentially toxic to humans. Representative undesirable heavy metals are zinc, lead, copper, cadmium and nickel. Unfortunately, at the present time, none of the landfill liners known to be used in the United States or in other countries of the world are designed to effectively capture the heavy metal contaminants in leachate if the landfill liner should be ruptured or otherwise penetrated by the leachate.

Synthetic plastic landfill liners lend themselves to being ruptured, and conventional bentonite clay landfill liners lend themselves to being penetrated if leachate fills up to such a high level in the landfill that it starts to force its way through the clay barrier. Moreover, it is well known that despite all efforts landfill liners cannot be made perfect and that eventually all presently known types of landfill liners will eventually begin to leak.

Thus, there is a long-felt need for a new landfill liner that would act to capture a significant amount of the potentially toxic heavy metal contaminants in leachate before the leachate enters the groundwater when a leakage does occur in the landfill liner. Applicants have discovered such an advantageous landfill liner with unexpected and surprising capability for capturing and removing heavy metals from leachate passing therethrough if leakage of the landfill liner occurs.

DISCLOSURE OF THE INVENTION

In accordance with the present invention applicants provide a landfill liner designed specifically for capturing certain heavy metal contaminants and the like during a leakage of leachate through the landfill liner. The landfill liner provides for adding lime to conventional clay in order to achieve the advantageous landfill liner of the invention. Preferably, an amount of lime between about 20%–50% by weight of the clay is used. Although other constructions are contemplated as within the scope of the invention, applicants presently contemplate that the clay and lime landfill liner may be formed from successive layers of clay and lime laid one upon the other; an admixture of clay and lime applied in a singular layer; and in a landfill membrane liner comprising an admixture of clay and lime contained between top and bottom plastic sheets.

It is therefore the object of the present invention to provide an improved landfill liner which eliminates the problems inherent in conventional landfill liners described hereinabove.

More specifically, it is the object of the present invention to provide an improved landfill liner that acts to remove heavy metals and the like from leachate passing therethrough in the event of a leakage in the landfill liner.

It is another object of the present invention to provide an improved landfill liner that serves to prevent contamination of groundwater by potentially toxic heavy metals such as zinc, lead, copper, cadmium and nickel contained in leachate within the landfill.

It is still another object of the present invention to provide an inexpensive landfill liner that provides for capturing heavy metal contaminants from leachate to prevent groundwater contamination by these potentially toxic contaminants and yet provides no detrimental effect to the other required functional characteristics of the landfill liner.

Some of the objects of the invention having been stated, other objects will become evident as the description proceeds, when taken in connection with the accompanying drawing described hereinbelow.

BRIEF DESCRIPTION OF THE DRAWINGS

FIG. 1 is a graph of the permeability of four (4) different lime and clay mixtures used in the landfill liner of the present invention

BEST MODE FOR CARRYING OUT THE INVENTION

Modern landfills for municipalities and the like are required to have leachate collection and removal systems, leachate leak detection systems, and landfill liner systems to help prevent landfill leakage. Conventional landfill liners that are typically used are (1) synthetic plastic membranes; (2) a layer of suitable clay composition; and (3) combinations of both in particularly well protected landfills.

As is well known to those skilled in the art, leachate is a complex mixture of organic and inorganic materials, and many of these materials are potentially toxic to humans. If leachate should leak into the groundwater due to leakage in the landfill liner and contaminate the water, it could render the groundwater unavailable for human use until the hazard was resolved and the water rendered clean again.

One of the major constituents of leachate that renders it so potentially damaging to the wastewater environment is heavy metals such as zinc, lead, copper, nickel, cadmium and other similar heavy metals. At certain significant concentrations in the water, these heavy metals are all substantially toxic, and thus drinking water is routinely regulated to ensure that only safe concentrations of these dangerous heavy metals are present in the water.

Conventional leachate collection is achieved by installing a landfill liner under the landfill refuse that is intended to prevent the leachate from seeping into the ground and the groundwater therebeneath, and installing collection pipes to collect the leachate and remove it to a central location at which it is treated and rendered safe. The aforementioned three types of landfill liners that are used are the synthetic plastic liners and the clay liners and a combination of both liners. The clay preferred for the clay layer landfill liner is usually bentonite. Also, applicants understand that a preferred form of bentonite clay, montmorillonite, is also used for clay landfill liners. In some states in the United States, both types of landfill liners are used in combination to provide additional assurance against groundwater contamination due to leakage of the leachate through the landfill liner. Unfortunately, all of the conventional landfill liners have proven to be less than effective and many are known to routinely leak from time to time.

The synthetic plastic membrane liners are not particularly durable and are subject to breakage during landfill construction and operation. The clay liners are relatively more durable than the synthetic plastic membranes, and clay landfill liners have historically provided the best barrier against groundwater contamination from leachate leakage through the landfill liner. The clay liners are designed to achieve the lowest possible hydraulic conductivity, but the compacted clay components of the landfill liner may release some seepage in time under sustained hydraulic head pressure. Although suffering from this well-known shortcoming, conventional clay landfill liners are still the best known defense for preventing groundwater pollution from landfill leachate seepage through the landfill liner.

Unfortunately, clay landfill liners are only partially effective in removing very hazardous heavy metals such as the aforementioned zinc, lead, copper, nickel, cadmium and related heavy metals. Thus, if the quantity of leachate builds up in a landfill due to clogging of the collection piping, inadequate operation of the collection and removal system and/or inattention to the refuse landfill by maintenance personnel, the leachate can begin to penetrate into the clay landfill liner. Although the permeability of the clay landfill liner is relatively low, the leachate will eventually seep through the clay liner and enter the groundwater in the ground beneath the landfill liner.

As stated above, the clay most commonly used for the construction of landfill liners in the United States is bentonite. In bentonite clay, the predominate clay is montmorillonite which is a pure form of bentonite and this clay is preferred in the practice of applicants' invention to be described hereinafter. Although the montmorillonite form of bentonite clay is preferred in the present invention, applicants contemplate that many other types of suitable clays can be used in the construction of the novel landfill liner of the invention.

Applicants' novel landfill liner that acts to better capture the potentially toxic heavy metals in leachate is achieved by changing the nature of the clay used for landfill liners by adding conventional lime (calcium hydroxide) to the montmorillonite form of bentonite clay or to any other suitable clay composition. The addition of lime serves to increase the pH of the clay from about 4.0 to between about 9.0 to 12.0, and this results in enhancing its cation exchange capacity (the ability of the clay to remove positively charged heavy metal ions) and thus facilitates removal of significantly more of the heavy metals as leachate seeps through the novel clay and lime landfill liner of the invention. Thus, the addition of lime to the clay used in the novel landfill liner will reduce the concentration of heavy metals (for example, the zinc concentration from 2000 mg/L to 20 mg/L), and alter the hydraulic conductivity of the clay composition (for example, from $10^{-7}$ cm/s to $10^{-8}$ cm/s depending on the concentration of lime used). Applicants' novel clay and lime landfill liner provides improved heavy metal ion removal capability to alleviate groundwater pollution caused by heavy metals in landfill leachate seepage, and the landfill liner is economical and easy to construct with conventional lime composition.

Applicants presently believe that lime should preferably be used in the amount of about 20% to 50% by weight of clay, preferably montmorillonite form of bentonite clay. Applicants have discovered that the addition of lime to the montmorillonite clay serves to enhance the heavy metal ion removal ability of the clay and does not significantly increase the permeability of the landfill liner mixture of montmorillonite clay and lime. Applicants have conducted experiments and the test results for these experiments are set forth below to support the efficacy of the novel landfill liner of the invention.

Although the clay and lime landfill liner of the invention could be constructed in many different manners by one skilled in the art of landfill liner construction, applicants presently contemplate three (3) preferred methods for preparing the mixture of lime and clay to form the novel landfill liner. First of all, a method can be utilized wherein one layer of clay (preferably montmorillonite form of bentonite) is covered by a layer of lime, and the lime is then mixed with the clay by a suitable method. This mixture is then in turn covered by a successive layer of clay that is in turn covered by a successive layer of lime and again mixed, etc. until a suitable landfill liner depth is reached. Preferably, each layer of lime is about 1.0 inch in depth and each layer of clay is about 6.0 inches in depth in order to provide a total depth of about 8.0 to 48.0 inches for the landfill liner.

A second method for practicing applicants' invention provides for mixing the lime and clay in a thorough mixing of the two dry powders. This can be accomplished with a conventional rotating drum such as a cement mixer or any other apparatus that is adapted for mixing dry powders into a suitable admixture. The mass of lime required in the mixing method is also about 20% to 50% of the dry weight of clay and the mixture is then introduced into the bottom of the landfill and compacted in the manner traditionally used to construct landfill liners. The depth of the clay and lime admixture should be about 12.0 to 48 inches.

Finally, applicants contemplate that a landfill liner could be manufactured that would contain a thin layer (for example, about 0.25 inches) of an admixture of clay and lime within a top and bottom sheet of synthetic plastic membrane (for example, polyethylene, polypropylene, or polyvinylchloride). The manufactured liner is placed on the bottom of the landfill site and would behave as both a synthetic membrane and a clay barrier to prevent leachate seepage therethrough. The clay and lime admixture contained between the membranes would act as a barrier to prevent the seepage of heavy metals through the landfill liner and into the groundwater if the plastic membrane develops a rupture.

EXPERIMENTAL TESTING RESULTS

Applicants have conducted tests to determine the absorption of zinc metal ions by the lime-amended clay and determined that the addition of lime to the montmorillonite can increase the removal of the heavy metal by a factor of up to 13. To conduct the tests, applicants utilized batches of dilute mixtures of clay and lime and known concentrations of zinc. The details of the absorption testing are set forth below.

Applicants used three clay-lime suspended solutions for the batch tests (0%, 10% and 20%). 5 grams of montmorillonitic clay was mixed with each percentage of lime. One liter of D.I. (deionized) water was then added. After the clay-lime suspended solutions were continued for an hour, the different mass of zinc chloride was individually added into the three clay-lime suspended solutions. After 24 hours, the clay-lime-zinc suspended solutions were sampled and analyzed. Table 1 shows the composition of the three clay-lime suspended solutions for the batch test.

TABLE 1

|  | Test 1 | Test 2 | Test 3 |
|---|---|---|---|
| Clay | 5 g | 5 g | 5 g |
| Lime | 0 g (0%) | 0.5 g (10%) | 1 g (20%) |
| D.I. Water | 1 L | 1 L | 1 L |
| Zinc Chloride | 2.1142 g (1000 µg/ml) | 2.1142 g (1000 µg/ml) | 2.1142 g (1000 µg/ml) |
| Zinc Chloride | 19.0278 g (9000 µg/ml) | 19.0278 g (9000 µg/ml) | 19.0278 g (9000 µg/ml) |

The results of the zinc absorption testing are set forth in Table 2 below.

TABLE 2

Zinc (II) Adsorption on Lime-Treated Montmorillonite

| Initial Zinc (II) Concentration (µg/ml) | Adsorbed Zinc (II) (µg/ml) by 5 grams of montmorillonite and | | |
|---|---|---|---|
|  | 0.00 g of lime | 0.50 g of lime | 1.00 g of lime |
| 1000 | 60.67 ± 4.91 | 456.25 ± 2.95 | 823.745 ± 2.65 |
| 5000 | 358.51 ± 20.98 |  |  |
| 9000 | 547.09 ± 23.64 | 1472.17 ± 33.47 | 1812.10 ± 39.91 |

Note: The ranges indicate 95% confidence interval, based on 8 repetitions

Also, applicants conducted permeability tests using permeability column testing to simulate the action of the novel lime-amended clay landfill liner and its resistance to flow and its ability to remove potentially toxic heavy metals such as zinc. The details of the permeability column testing are described below.

(A) Method for the prevention of the side wall leakage:
50 grams of pure montmorillonitic clay was mixed with 45 grams of D.I. (deionized) water. The dimensions of the permeability column were 4.378 inches for the outer diameter, 3.875 inches for the inner diameter, and 8.0 inches for the height. Then the mixture was petted inside the surface of the column about 0.5 cm in thickness and 6.0 cm in height. Each column of the test was treated with the petted clay procedure.

(B) Method for the mixture of the clay media for the permeability tests:
Table 3 below shows the compositions of the clay media.

TABLE 3

|  | Test 1 | Test 2 | Test 2 | Test 2 |
|---|---|---|---|---|
| Clay | 100 g | 100 g | 100 g | 100 g |
| Sand | 400 g | 400 g | 400 g | 400 g |
| Lime (#) | 0 g (0%) | 10 g (10%) | 20 g (20%) | 50 g (50%) |
| D.I. Water (*) | 80 g (16%) | 81.6 g (16%) | 83.2 g (16%) | 88 g (165) |

(#): The percentage is based on the weight of clay.
(*): is the moisture content of the entire media. The percentage is based on the total weight of clay, sand, and lime Applicants used two mixtures for each test. For each test, the components were well mixed and then compacted into the previously prepared clay column. After the compaction, blocks of the same height as the remaining height of the column were put into the column to keep the entire mixture volume constant.

(c) Method for obtaining permeability data shown in FIG. 1:

Four tanks A, B, C and D above the columns were used for the testing. The water head was 150 cm. Each tank had 20 liters of D.I. (deionized) water. The columns were connected with tank A, and three tubes connect tank A, B, C, and D. A nitrogen cylinder was connected with tank D and provided 10 psi pressure. The function of tank B, C, and D was to maintain the constant head of tank A for the columns. Every 24 hours, the leachate was collected and measured.

Darcy's Law was used to calculate the permeability of each clay porous media. The permeability tests were conducted for 28 days and the results are set forth in FIG. 1 of the drawings. Data for the 50% lime mixture is available and shown for only 13 days.

The results of the permeability column test shown in FIG. 1 clearly illustrate that the lime-amended clay permeability does not change with time and actually decreases at higher lime concentration.

It will thus be seen that there has been described above a novel and improved landfill liner that will serve to better remove potentially toxic heavy metals from leachate that seeps therethrough. The landfill liner is inexpensive and can be constructed using conventional clay landfill liner construction techniques.

It will be understood that various details of the invention may be changed without departing from the scope of the invention. Furthermore, the foregoing description is for the purpose of illustration only, and not for the purpose of limitation--the invention being defined by the claims.

What is claimed is:

1. In a landfill of the type including a clay landfill liner and a system for collecting and removing leachate generated by the landfill, the improvement comprising an improved landfill liner for capturing heavy metals and the like to prevent groundwater contamination in the event of leakage of leachate through the landfill liner, said landfill liner comprising a plurality of successive layers of clay and lime that are each mixed subsequent to placement and prior to being covered by another layer of clay and lime that are in turn mixed together.

2. In a landfill of the type including a clay landfill liner and a system for collecting and removing leachate generated by the landfill, the improvement comprising an improved landfill liner for capturing heavy metals and the like to prevent groundwater contamination in the event of leakage of leachate through the landfill liner, said landfill liner comprising an admixture of clay and lime.

3. In a landfill of the type including a clay landfill liner and a system for collecting and removing leachate generated by the landfill, the improvement comprising an improved landfill liner for capturing heavy metals and the like to prevent groundwater contamination in the event of leakage of leachate through the landfill liner, said landfill liner is a membrane comprising an admixture of clay and lime contained between top and bottom plastic sheets.

4. In a landfill according to claim 3, wherein said admixture of clay and lime comprises a layer about 0.25 inches in thickness.

5. In a landfill according to claim 3, wherein said plastic sheets are selected from the group consisting of polyethylene, polypropylene and polyvinylchloride.

6. A landfill liner for enhanced removal of heavy metals and the like to prevent groundwater contamination in the event of seepage of leachate through the landfill liner, the landfill liner comprising a plurality of successive layers of clay and lime that are each mixed subsequent to placement and prior to being covered by another layer of clay and lime that are in turn mixed together.

7. A landfill liner for enhanced removal of heavy metals and the like to prevent groundwater contamination in the event of seepage of leachate through the landfill liner, the landfill liner comprising an admixture of clay and lime.

8. A landfill liner for enhanced removal of heavy metals and the like to prevent groundwater contamination in the event of seepage of leachate through the landfill liner, the landfill liner is a membrane comprising an admixture of clay and lime contained between top and bottom plastic sheets.

9. A landfill liner according to claim 8, wherein said admixture of clay and lime comprises a layer about 0.25 inches in thickness.

10. A landfill liner according to claim 8, wherein said plastic sheets are selected from the group consisting of polyethylene, polypropylene and polyvinylchloride.

* * * * *